(12) United States Patent
Alber et al.

(10) Patent No.: US 9,604,318 B2
(45) Date of Patent: Mar. 28, 2017

(54) APPARATUS AND METHOD FOR PRODUCING A TAILORED SHEET METAL STRIP OR METAL PROFILE

(71) Applicant: WISCO LASERTECHNIK GMBH, Ravensburg (DE)

(72) Inventors: Gerhard Alber, Berg (DE); Martin Retzbach, Ravensburg (DE)

(73) Assignee: Wisco Lasertechnik GmbH, Ravensburg (DE)

( * ) Notice: Subject to any disclaimer, the term of this patent is extended or adjusted under 35 U.S.C. 154(b) by 25 days.

(21) Appl. No.: 14/081,145

(22) Filed: Nov. 15, 2013

(65) Prior Publication Data

US 2014/0117069 A1    May 1, 2014

Related U.S. Application Data

(63) Continuation of application No. PCT/EP2012/058866, filed on May 14, 2012.

(30) Foreign Application Priority Data

May 19, 2011   (DE) .................. 10 2011 050 476

(51) Int. Cl.
   *B21D 35/00*   (2006.01)
   *B23K 37/00*   (2006.01)
   (Continued)

(52) U.S. Cl.
   CPC ............ *B23K 37/00* (2013.01); *B21C 37/065* (2013.01); *B21C 37/08* (2013.01); *B21C 37/158* (2013.01);
   (Continued)

(58) Field of Classification Search
   CPC .................................................. B21B 15/0085
   See application file for complete search history.

(56) References Cited

U.S. PATENT DOCUMENTS 1,654,037 A * 12/1927 Clark ............................. 228/138
3,113,435 A * 12/1963 Yount ............................. 405/270
(Continued)

FOREIGN PATENT DOCUMENTS

DE        198 52 462 A1    5/2000
DE  10 2009 020 614 A1   12/2009
(Continued)

OTHER PUBLICATIONS

International Search Report and Written Opinion (Application No. PCT/EP2012)058866) dated Dec. 20, 2012.
(Continued)

*Primary Examiner* — Devang R Patel
(74) *Attorney, Agent, or Firm* — Burr & Brown, PLLC (57) ABSTRACT

An apparatus for producing a tailored sheet metal strip, comprising at least one welding station, by means of which at least two sheet metal strips can be welded to one another along their longitudinal edges, and at least two strip feeding devices for respectively feeding one of the sheet metal strips into the at least one welding station, wherein the at least two strip feeding devices and the at least one welding station define a production line. A further-processing station for further processing is integrated in the production line downstream of the at least one welding station in the strip running direction and is equipped with tools for applying reinforcing material, to local points of at least one of the sheet metal strips which are connected to one another, for punching holes and/or for forming at least one of the sheet metal strips which are connected to one another.

7 Claims, 6 Drawing Sheets

(51) Int. Cl.
  *B23K 26/34*   (2014.01)
  *B21D 39/03*   (2006.01)
  *B23K 26/00*   (2014.01)
  *B21C 37/06*   (2006.01)
  *B21C 37/08*   (2006.01)
  *B21C 37/15*   (2006.01)
  *B23K 26/32*   (2014.01)

(52) U.S. Cl.
  CPC .......... *B21D 35/00* (2013.01); *B21D 35/006* (2013.01); *B21D 39/031* (2013.01); *B23K 26/0093* (2013.01); *B23K 26/262* (2015.10); *B23K 26/32* (2013.01); *B23K 26/34* (2013.01); *B23K 2201/185* (2013.01); *B23K 2203/10* (2013.01); *B23K 2203/15* (2015.10); *B23K 2203/18* (2013.01); *B23K 2203/50* (2015.10)

(56) References Cited

U.S. PATENT DOCUMENTS

| | | | | |
|---|---|---|---|---|
| 3,319,040 | A | * | 5/1967 | Rudd .............................. 219/102 |
| 3,390,564 | A | * | 7/1968 | Syre ....................... B21B 1/0805 |
| | | | | 228/118 |
| 3,477,114 | A | * | 11/1969 | Kaufmann ............. B21D 49/00 |
| | | | | 228/117 |
| 3,737,979 | A | * | 6/1973 | Rakich .................. B21B 1/0805 |
| | | | | 219/102 |
| 4,377,732 | A | * | 3/1983 | Preller .......................... 219/608 |
| 4,798,932 | A | * | 1/1989 | Dion ....................... B23K 20/04 |
| | | | | 219/155 |
| 2001/0020609 | A1 | * | 9/2001 | Kummle ............. B21C 37/0803 |
| | | | | 219/121.63 |
| 2012/0061453 | A1 | | 3/2012 | Vogt et al. |

FOREIGN PATENT DOCUMENTS

| | | |
|---|---|---|
| DE | 10 2009 021 112 A1 | 12/2009 |
| DE | 10 2008 038 655 A1 | 2/2010 |
| DE | 10 2008 046 160 A1 | 3/2010 |
| DE | 10 2008 060 467 A1 | 6/2010 |
| DE | 102008060467 A1 * | 6/2010 |
| DE | 10 2010 060 480 B3 | 3/2012 |
| JP | 08-281306 A1 | 10/1996 |
| WO | 2010/045571 A1 | 4/2010 |

OTHER PUBLICATIONS

German Office Action (Application No. 10 2011 050 476.1) dated Jan. 22, 2013.
European Office Action, European Application No. 12 720 207.5. dated May 22, 2015 (5 pages).

* cited by examiner

APPARATUS AND METHOD FOR PRODUCING A TAILORED SHEET METAL STRIP OR METAL PROFILE

CROSS REFERENCE TO RELATED APPLICATIONS

This application is a continuation of International Application No. PCT/EP2012/058866 filed May 14, 2012, which designated the United States, and claims the benefit under 35 USC §119(a)-(d) of German Application No. 10 2011 050 476.1 filed May 19, 2011, the entireties of which are incorporated herein by reference.

BACKGROUND OF THE INVENTION

1. Field of the Invention

The invention relates to an apparatus for producing a tailored sheet metal strip, and a method for producing a tailored sheet metal strip or metal profile.

2. Description of Related Art

The production of tailored sheet metal strips, what are termed "tailored strips", is known and described inter alia in DE 10 2008 038 655 A1. After they have been welded along their longitudinal edges, the sheet metal strips are coiled and made available to the customer as a coil for further processing, for example for producing longitudinal members for motor vehicle bodies.

SUMMARY OF THE INVENTION

The present invention is based on the object of improving an apparatus and a method of the type comprising at least one welding station, by means of which at least two sheet metal strips can be welded to one another along their longitudinal edges, and comprising at least two strip feeding devices for respectively feeding one of the sheet metal strips into the at least one welding station, wherein the at least two strip feeding devices and the at least one welding station define a production line, to the effect that they afford at least one additional production function compared to conventional apparatuses and methods of this nature, such that a higher-value semifinished product or even finished product can be produced at relatively low cost in the production line.

The apparatus according to the invention is characterized in that at least one further-processing station for further processing the tailored sheet metal strip is integrated in the production line defined by the strip feeding devices and the welding station, wherein the further-processing station is arranged downstream of the at least one welding station in the strip running direction and is equipped with means, in particular tools, for applying additional material, in particular reinforcing material, to local points of at least one of the sheet metal strips which are connected to one another, for punching holes and/or for forming at least one of the sheet metal strips which are connected to one another.

The apparatus according to the present invention therefore affords at least one additional production function compared to conventional apparatuses for producing tailored sheet metal strips ("tailored strips"). Higher-value semifinished products or, in certain cases, even finished products can thus be produced from the tailored sheet metal strips at relatively low cost in a single production line (process chain). The apparatus according to the invention makes it possible to achieve a higher production capability. As a result of the higher production capability, it is possible at the same time to achieve higher productivity than in the case of production which is divided between a plurality of sites. Higher productivity makes it possible to reduce costs. Furthermore, experience has shown that a higher production capability also leads to an improvement in the quality of the semifinished products or finished products which are produced, since the various production steps can be optimally coordinated with one another given higher productivity.

An advantageous configuration of the method according to the invention is characterized in that the at least two sheet metal strips are welded in the welding station with a continuous strip feed or at a constant welding speed, while the sheet metal strips welded to one another are guided downstream of the welding station, in the strip running direction, in such a manner that they form a strip loop, and are moved further intermittently downstream of the strip loop, wherein at least one of the sheet metal strips is processed in the at least one further-processing station during a standstill phase of a portion of the tailored sheet metal strip. In this way, reinforcing elements in the form of sheet metal blanks can be applied, in particular locally, to at least one of the sheet metal strips of the tailored sheet metal strip which are connected to one another. Depending on the application, such a tailored sheet metal strip reinforced in certain regions can be coiled to form a coil or cut to length, in which case it can be cut to length by means of a mechanical or thermal cutting tool, in particular by means of a cutting torch, preferably a laser cutting torch. It is particularly preferable that the tailored sheet metal strip is cut to length during the stop phase of the intermittently moving strip portion or during the application of the local reinforcing elements.

Another advantageous configuration of the method according to the invention is characterized in that the at least two sheet metal strips are welded in the welding station and also at least one of the sheet metal strips welded to one another is processed in the at least one further-processing station in each case with a continuous strip feed, wherein a welding tool, a punching tool and/or a clinching tool for processing the at least one of the sheet metal strips welded to one another in the further-processing station is concomitantly moved with the sheet metal strips welded to one another. In this configuration of the method according to the invention, it is possible to dispense with the formation of a strip loop as a strip accumulator for compensating between continuous and intermittent strip feed. In this configuration of the method, it is not necessary for the tailored sheet metal strip produced from the sheet metal strips welded to one another along their longitudinal edges to be either decelerated or accelerated. This can be advantageous particularly when connecting relatively thick, heavy and/or flexurally rigid metal strips, which may lead to high dynamic stresses in a plant for producing tailored strips and require a correspondingly more complex construction or installation of the plant. The handling appliance or tool, for example welding tool, which is used to further process the tailored sheet metal strip in the production line will, by contrast, often have a relatively low mass, or can be accelerated and decelerated more easily in terms of design.

A further advantageous configuration of the method according to the invention provides that the sheet metal strips welded to one another are formed to give an open or closed profile by means of roll forming in the production line. In the case of a closed profile, this is preferably integrally connected along its mutually facing longitudinal edges, which form an open longitudinal seam, in a further processing step in the production line. Furthermore, the thus produced open or closed profile can be cut to length as required at the end of the production line.

BRIEF DESCRIPTION OF THE DRAWINGS

The invention will be explained in more detail hereinbelow with reference to a drawing showing a plurality of exemplary embodiments.

DETAILED DESCRIPTION OF THE INVENTION

Figure 1:
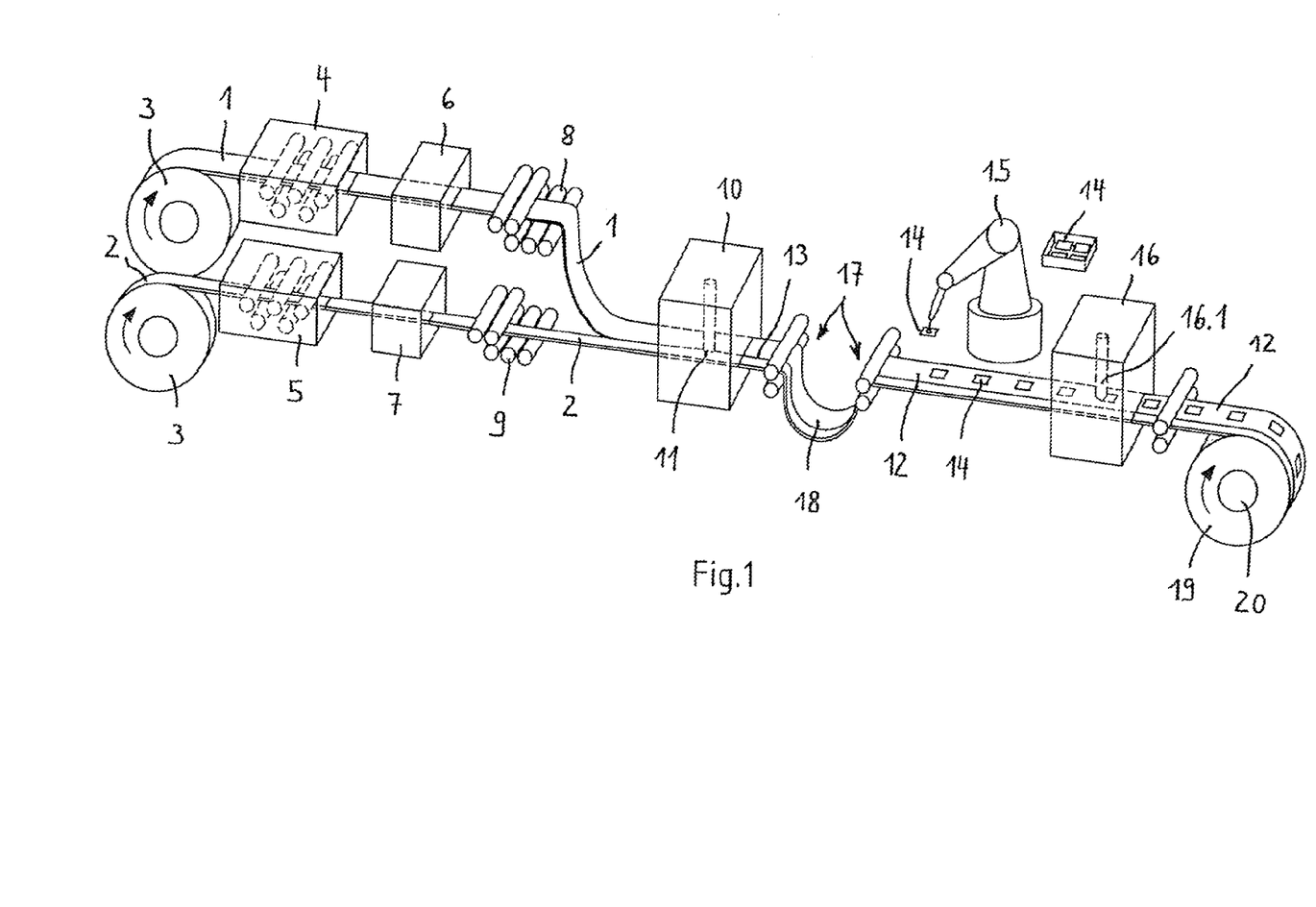
FIG. 1 shows a first exemplary embodiment of an apparatus according to the invention in a perspective illustration.

FIG. 1 shows a first exemplary embodiment of an apparatus or plant according to the invention for producing tailored sheet metal strips ("tailored strips") 12. At least two slit strips 1, 2 of differing thickness, material quality and/or surface condition are welded to one another along the longitudinal sides in the apparatus. The slit strips 1, 2 can typically be produced from steel strips of differing quality and/or thickness. Similarly, however, the tailored strips 12 can also be produced from non-ferrous sheet metal strips, for example from aluminum and/or magnesium strips of differing qualities and/or thicknesses. Furthermore, the tailored sheet metal strips 12 can also be formed from a combination of different materials, for example from a combination of steel strip and non-ferrous strip, a combination of aluminum and magnesium, etc.

The slit strips 1, 2 to be welded to one another are present in the form of coils 3. The individual slit strips or sheet metal strips 1, 2 are firstly flattened in separate straightening machines 4, 5 after they have been uncoiled from the respective coil 3. This is preferably followed by edge machining, in which at least the edges of the slit strips 1, 2 which are to be welded can be prepared for the subsequent welding process by means of milling and/or grinding machines 6, 7.

Separate conveying means (driver units) 8, 9 and strip guiding devices, for example, strip guiding rollers, are used to feed the slit strips 1, 2 to one welding apparatus 10 or, in the case of more than two slit strips 1, 2, a correspondingly larger number, reduced in each case by one, of welding apparatuses 10 arranged in succession in the strip running direction, where they are welded to one another in continuous operation. In this case, the slit strips 1, 2 are usually guided together in such a way that their mutually facing longitudinal edges can be butt-welded to one another. It is also within the scope of the present invention, however, to weld the slit strips 1, 2 or, in the case of more than two slit strips 1, 2, at least two of the slit strips to one another so that they overlap.

The slit strips 1, 2 can be welded to one another continuously. Here, the welding method used is preferably laser welding. Alternatively, however, the welding method employed when carrying out the method according to the invention can also be, for example, high-frequency welding or friction stir welding (FSW).

Shielding gas (inert gas), e.g. nitrogen gas, is preferably fed to the working point 11 of the welding or laser beam, in order to prevent oxidation of the weld seam 13. Furthermore, the at least one weld seam 13 is preferably heat-treated locally by subsequent heating, in order to eliminate or at least reduce possible stress peaks.

As an alternative or in addition to the subsequent seam heating, the tailored sheet metal strip 12 is temporarily heated over its entire width or over the width of one of its sheet metal strips (slit strips) 1, 2, in order to homogenize the microstructure of the sheet metal strip 12. In this context, the sheet metal strip 12 is heated to a temperature in the range of 200° C. to 500° C. The temporary heating is preferably effected in an inert gas atmosphere.

Figure 2A:
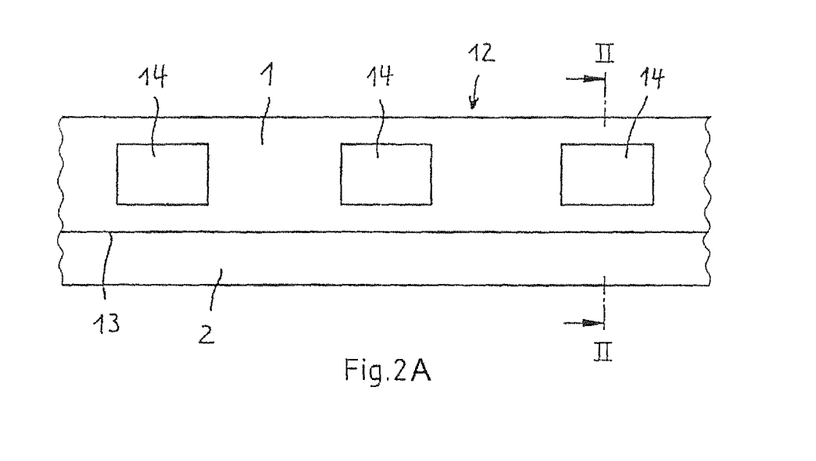
FIG. 2A shows a longitudinal portion of a tailored sheet metal strip in plan view.
Figure 2B:
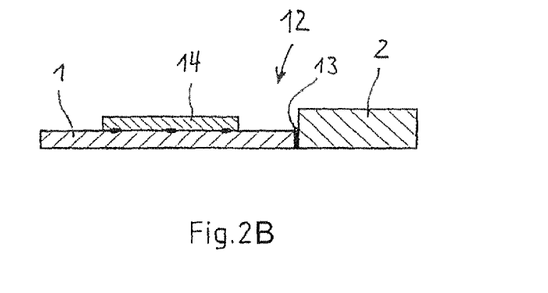
FIG. 2B shows a cross-sectional view of the sheet metal strip shown in FIG. 2A along the line of intersection II-II of FIG. 2A.

The strip feeding devices 4, 5, 8, 9 and the at least one welding station 10 define a production line. According to the invention, at least one further-processing station is integrated in the production line, is arranged downstream of the at least one welding station 10 in the strip running direction and has means for applying reinforcing elements 14 locally. The reinforcing elements 14 can be, for example, substantially planar sheet metal blanks (what are termed "patches"), which are applied by means of a handling appliance or a robot 15 to predefined points of at least one of the sheet metal strips (slit strips) 1, 2 connected to one another. In the case of a tailored sheet metal strip 12 which is formed from slit strips 1, 2 of differing thickness, the reinforcing elements 14 are preferably applied to the thinner (1) slit strip or slit strips 12 of the tailored sheet metal strip 12 (cf. FIGS. 2A and 2B). The reinforcing elements 14 are connected to the slit strip or slit strips 1, 2 of the tailored sheet metal strip 12 by spot welding, clinching or the production of elongate or circumferential weld seams by means of laser welding, preferably by means of laser remote welding.

When the reinforcing elements 14 are joined by laser welding, the laser beam is moved over the workpiece after focusing, preferably with a mirror scanner (not shown). The mirror scanner comprises, for example, a plurality of rotatable facet mirrors or tiltable deflection mirrors, which can direct the laser beam onto different sites of the workpiece depending on the set angles of the mirrors. The laser beam or the working point thereof can thus be positioned at high speed. This type of joining is also referred to as laser remote welding.

The processing station for joining the reinforcing elements 14 is denoted by 16 in FIG. 1. Whereas the continuous welding of the sheet metal strips (slit strips) 1, 2 is preferably effected at a substantially constant welding speed, it may be necessary to interrupt the strip feed for joining the reinforcing elements 14. For this purpose, an accumulator device 17 for receiving a strip loop 18 is arranged between the welding station 10, by means of which the at least two sheet metal strips 1, 2 are welded to one another along at least one of their longitudinal edges, and the point at which the reinforcing elements 14 are applied to at least one of the sheet metal strips 1, 2 and then firmly connected to the sheet metal strip at working point 16.1 of the processing station for joining the reinforcing elements 16 (cf. FIG. 1).

Depending on the application, the sheet metal strips (tailored sheet metal strips) 12 which are locally reinforced in this way can be coiled at the end of the production line to form a coil 19, or alternatively can be transversely cut into tailored metal sheets of desired length by means of a cutting device (not shown in FIG. 1). The cutting device for cutting the tailored sheet metal strip 12 to length can in this case have a mechanical cutting tool or a cutting torch, preferably a laser cutting torch. At its end, the production line shown in FIG. 1 comprises a coiling device 20 for coiling the locally reinforced tailored sheet metal strip 12.

Figure 3:
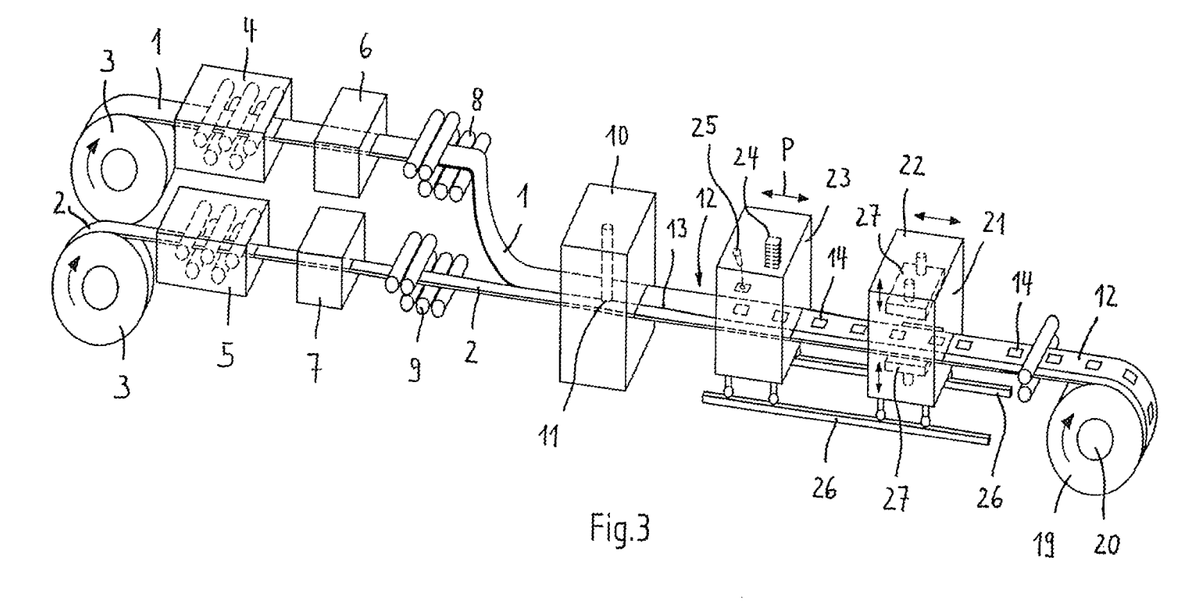
FIG. 3 shows a second exemplary embodiment of an apparatus according to the invention in a perspective illustration.
Figure 4A:
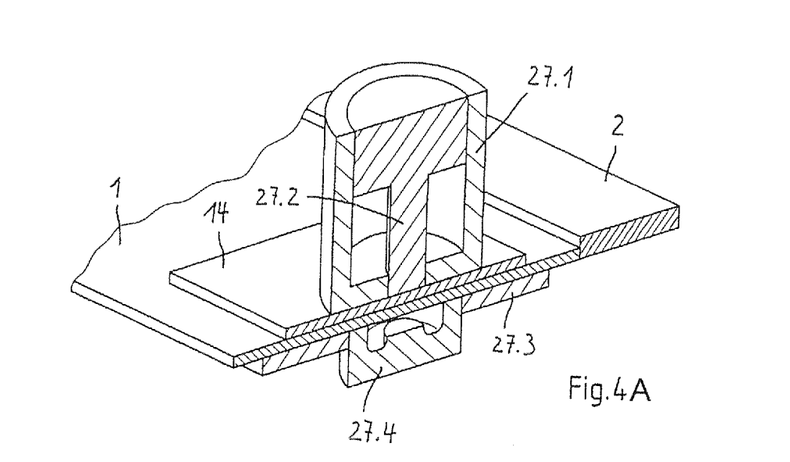
FIGS. 4A to 4D show a press tool of the apparatus as shown in FIG. 3 for clinching a metal reinforcing sheet to a portion of a tailored sheet metal strip, in a perspective vertical sectional view.
Figure 4B:
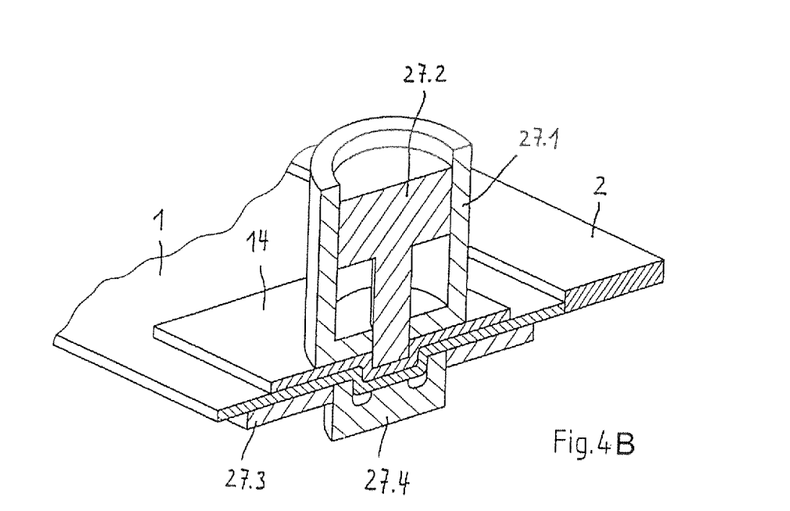
Figure 4C:
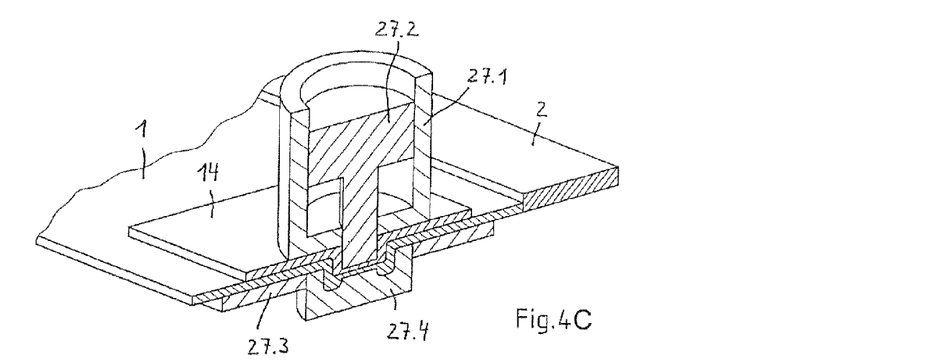
Figure 4D:
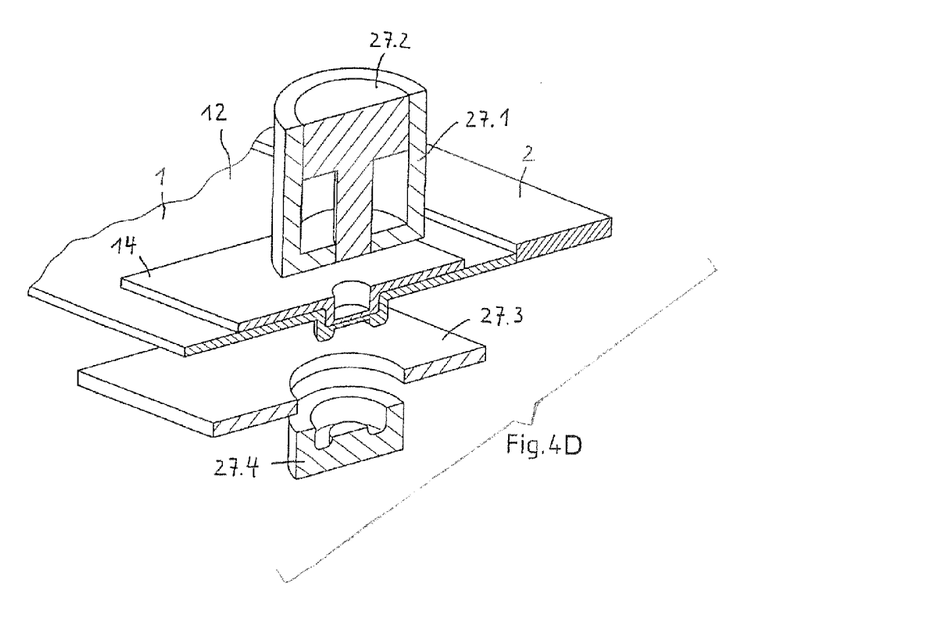

The exemplary embodiment of an apparatus (plant) according to the invention as shown in FIG. 3 differs from the exemplary embodiment shown in FIG. 1 substantially in that the at least one tool for further processing the tailored sheet metal strip 12 is held by means of a movably mounted carrier 21 and can be moved back and forth in the strip running direction by means of the carrier 21, such that it is possible to further process the tailored sheet metal strip 12 in the production line without an interruption in the strip feed. Accordingly, the apparatus shown in FIG. 3 does not have a strip accumulator device in the form of a strip loop between the at least one welding station 10 and the further-processing station 22.

In the exemplary embodiment shown in FIG. 3, too, reinforcing elements 14, for example sheet metal blanks (patches), are applied to predefined points of at least one of the sheet metal strips 1, 2 welded to one another. To this end, the apparatus has a carriage 23, which can be moved along the sheet metal strip 12 and is provided with a magazine 24 for receiving a supply of reinforcing elements 14 and a removal and feed device 25 for removing an individual reinforcing element from the magazine 24 and for feeding the removed reinforcing element 14 to at least one of the sheet metal strips 1, 2 welded to one another. The carriage 23 is guided by at least one guide rail 26 and can be moved in the direction of the double-headed arrow P. Instead of such a magazine carriage 23, however, a suitable handling appliance, in particular a robot 15 (shown in FIG. 1), can also be used in the apparatus shown in FIG. 3 for locally applying reinforcing elements 14.

The reinforcing elements 14 applied to the slit strip 1, 2 or the tailored sheet metal strip 12 are joined in the apparatus shown in FIG. 3 by clinching. The clinching tool 27 is likewise held on a movably mounted carrier 21 and can be moved back and forth in the strip running direction by means of the carrier 21. The carrier 21 can to this end in turn have a carriage-like form and can be guided on a guide rail 26 parallel to the longitudinal axis of the tailored sheet metal strip 12 produced. The clinching tool 27 comprises a holding-down means 27.1, a punch 27.2 movable relative to the holding-down means 27.1, a counterpressure plate 27.3, assigned to the holding-down means 27.1, for clamping the reinforcing elements 14 and the sheet metal strips 1, 2 to be connected to one another, and a die 27.4 assigned to the punch 27.2, wherein the counterpressure plate 27.3 additionally acts as an ejector after the sheet metal strips 1, 2, and reinforcing elements 14 have been connected in a force-fitting and form-fitting manner (cf. FIGS. 4A to 4D).

The assemblies or devices 21 to 25 for applying and joining the reinforcing elements 14 are accelerated out of their respective starting position to the speed of the strip feed, and position the respective reinforcing element 14 on the tailored sheet metal strip 12, or carry out the working step required to firmly connect the reinforcing element 14 and tailored sheet metal strip 12, as soon as synchronization with the tailored sheet metal strip 12 is reached. Then, the respective assembly (carriage) 21, 23 is returned in rapid traverse mode to its starting position for the next working step.

Instead of a clinching tool 27, the movable mounted assembly 22 can also have a welding tool, preferably a laser welding head, for joining the reinforcing elements 14.

Figure 5:
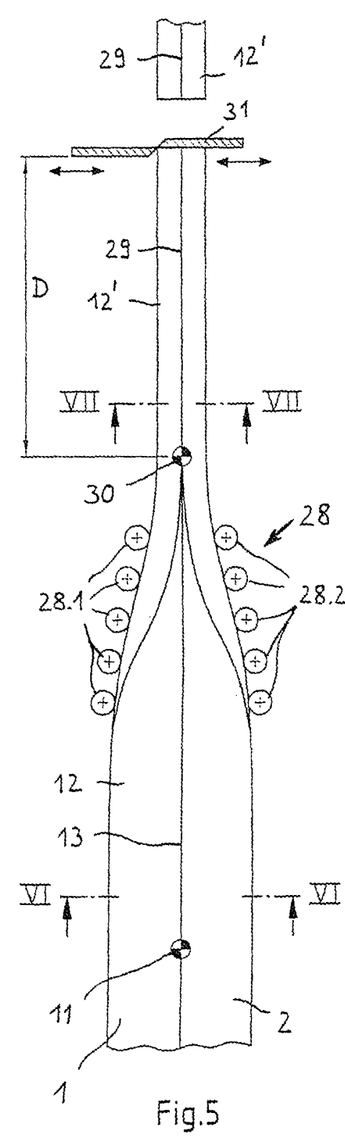
FIG. 5 shows a third exemplary embodiment of an apparatus according to the invention, of which merely a portion is shown in plan view.
Figure 6:
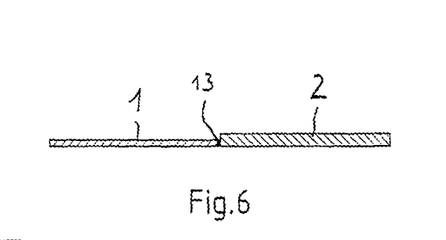
FIG. 6 shows a cross-sectional view of a tailored sheet metal strip produced in the apparatus shown in FIG. 5 along the line of intersection VI-VI of FIG. 5.
Figure 7:
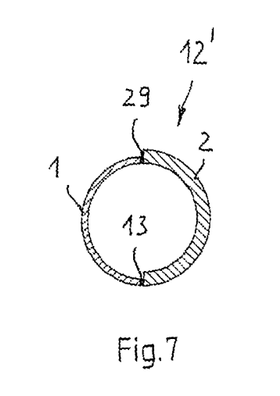
FIG. 7 shows a cross-sectional view of a tailored profile or tube produced in the apparatus shown in FIG. 5 along the line of intersection VII-VII of FIG. 5.

FIGS. 5 to 7 show a third exemplary embodiment of an apparatus (plant) according to the invention. The apparatus comprises—as in the exemplary embodiments shown in FIGS. 1 and 3—in turn separate straightening machines, grinding and/or milling machines for edge preparation and also separate conveying means (driver units) and strip guiding devices, which, however, are not shown in FIG. 5 for the sake of clarity.

The slit strips 1, 2 are guided together in such a way that their mutually facing longitudinal edges can be butt-welded to one another. Reference sign 11 denotes the working point 11 of a welding station 10. This joining process is followed by a forming process, in which the sheet metal strips (slit strips) 1, 2 welded to one another along their longitudinal edge are formed into a closed profile 12' by roll forming in the production line.

The further-processing station 28 which follows the welding station 10 in the strip running direction to this end has a multiplicity of pairs of rollers 28.1, 28.2 for roll forming the tailored sheet metal strip 12 produced from at least two sheet metal strips 1, 2. In the exemplary embodiment shown, the tailored sheet metal strip 12 is produced from slit strips 1, 2 of differing sheet metal thickness (cf. FIG. 6). The slit strips (sheet metal strips) 1, 2 can in this respect additionally differ in terms of their material quality, type of metal and/or surface condition. Furthermore, it is within the scope of the invention to use sheet metal strips 1, 2 possibly of identical thickness but differing in terms of their material quality, type of metal and/or surface condition for producing an open or closed profile 12' by roll forming a tailored sheet metal strip 12.

At least one further welding station for producing a tube longitudinal weld seam 29 is arranged downstream of the pairs of rollers 28.1, 28.2 in the strip running direction. The working point of this further welding station is denoted by 30. The sheet metal strips 1, 2 which are butt-welded to one another by means of the first welding station 10 are formed by the pairs of rollers 28.1, 28.2 in such a way that the thickness offset of the first weld seam 13 lies on the inner side of the profile (tube) 12', whereas the thickness offset on the second longitudinal weld seam 29 lies on the outer side of the profile (tube) 12'. The two longitudinal weld seams 13, 29 are preferably produced by laser welding. It is also possible, however, to form the sheet metal strip 12 by means of pairs of rollers in such a way that the thickness offset on the second longitudinal weld seam 29 is likewise arranged on the inner side of the profile (tube) 12'.

Finally, a separating device 31 for cutting the tailored open or closed profile 12' produced from the at least two sheet metal strips 1, 2 to length is arranged downstream of the working point 30 of the further welding station in the strip running direction. The opened or closed profile 12' is in turn cut to length by means of a mechanical cutting tool or by means of a cutting torch of the separating device 31, preferably a laser cutting torch. The distance D of the working point of the cutting tool or cutting torch of the separating device 31 from the working point 30 of the welding station can be set variably. The distance D can be set in an infinitely variable manner and/or in predefined steps.

The implementation of the present invention is not limited to the exemplary embodiments described above and shown in the drawing. Rather, numerous variants are conceivable which make use of the invention indicated in the accompanying claims even given a configuration which differs from the exemplary embodiments. Thus, for example, as an alternative or in addition to the application of local reinforcing elements 14 and/or roll forming of the tailored sheet metal strip 12, the latter can be perforated at predefined points by means of a punching tool (not shown) in a further-processing station arranged downstream of the welding station 10.

The invention claimed is:

1. A method for producing one of a tailored sheet metal strip and a metal profile comprising: feeding at least two sheet metal strips into at least one welding station by means of at least two strip feeding devices, and welding the at least two sheet metal strips to one another along their longitudinal edges, defining welded longitudinal edges,
   wherein the at least two strip feeding devices and the at least one welding station define a production line, the method further comprising integrating into the production line at least one further-processing station for further processing the at least two sheet metal strips welded to one another that is arranged downstream of the at least one welding station in a strip running direction, and
   wherein the at least one further-processing station is equipped with a) a movable feed device applying additional material to at least one of the welded sheet metal strips at positions spaced away from the welded longitudinal edges and without overlapping the welded longitudinal edges, and b) a joining tool that is concomitantly moved with the sheet metal strips for joining the additional material to at least one of the two sheet metal strips welded to one another.

2. The method as claimed in claim 1, wherein feeding the at least two sheet metal strips in the at least one welding station is a continuous strip feed, guiding the at least two sheet metal strips welded to one another downstream of the at least one welding station in the strip running direction, in such a manner that the at least two sheet metal strips welded to one another form a strip loop, and moving the at least two sheet metal strips welded to one another further intermittently downstream of the strip loop in the strip running direction, wherein at least one of the sheet metal strips is processed in the at least one further-processing station during a standstill phase of a portion of the at least two sheet metal strips welded to one another.

3. The method as claimed in claim 1, wherein feeding the at least two sheet metal strips into the at least one welding station and processing at least one of the sheet metal strips welded to one another in the at least one further-processing station in each case is a continuous strip feed, wherein the joining tool is one of a welding tool or a clinching tool.

4. The method as claimed in claim 1, wherein the movable feed device applying additional material comprises applying reinforcements in the form of sheet metal blanks to the at least one of the sheet metal strips welded to one another in the production line, and connecting the reinforcements to the at least one of the sheet metal strips by the joining tool.

5. The method as claimed in claim 1, wherein the at least two sheet metal strips for producing the tailored sheet metal strip have at least one of a differing thickness, a differing quality and a differing surface condition.

6. The method as claimed in claim 1, wherein the at least two sheet metal strips for producing the tailored sheet metal strips are of differing metal types.

7. The method as claimed in claim 6, wherein the differing metal types are aluminum and magnesium.

* * * * *